US005621415A

United States Patent [19]
Tuck

[11] Patent Number: 5,621,415
[45] Date of Patent: Apr. 15, 1997

[54] LINEAR CELL SATELLITE SYSTEM

[75] Inventor: Edward F. Tuck, West Covina, Calif.

[73] Assignee: Teledesic Corporation, Kirkland, Wash.

[21] Appl. No.: 340,004

[22] Filed: Nov. 15, 1994

[51] Int. Cl.⁶ .............................. H04B 7/185; H01Q 3/00
[52] U.S. Cl. ......................... 342/354; 342/358; 455/12.1; 455/13.3
[58] Field of Search ..................... 342/354, 358; 455/12.1, 13.3

[56] References Cited

U.S. PATENT DOCUMENTS 5,268,694  12/1993  Jan et al. .................................. 342/354
5,422,647   6/1995  Hirshfield et al. ....................... 342/354

FOREIGN PATENT DOCUMENTS 9307683  4/1993  France .

Primary Examiner—Gregory C. Issing
Attorney, Agent, or Firm—Anglin & Giaccherini

[57]  ABSTRACT

Methods for transmitting and receiving radiated energy (15a, 15b, 15c) from and to a satellite (12) which moves with respect to the Earth's surface are disclosed. The invention pertains to any satellite (12) which is not in an equatorial orbit at geosynchronous altitude. The present invention reduces hand-off overhead in systems that utilize satellite-fixed cells, augments frequency re-use, and enhances the communications and sensing capacity of the satellite. In accordance with the methods of the invention, satellite footprints (16a, 16b, 16c) are partitioned into linear spanning cells (18) and multiple linear segments (22). The linear spanning cells (18) resemble long strips that extend across an entire footprint (16a, 16b, 16c). Multiple linear segments (22) are smaller contiguous areas that lie within the linear spanning cells (18). The alignment of the linear spanning cells (18) across a footprint (16a, 16b, 16c) is determined by a correction angle φ, which compensates for the changing relative motion of the Earth's surface at various latitudes.

8 Claims, 15 Drawing Sheets

LINEAR CELL SATELLITE SYSTEM

CROSS-REFERENCES TO RELATED PATENT APPLICATIONS

The present Patent Application is related to the following pending Patent Applications:

Satellite Communication System by Edward Fenton Tuck et al., filed on 28 Feb. 1994 and assigned U.S. Ser. No. 08/203,140, and claiming the benefit of priority of a Parent Application entitled Satellite Communication System by Edward F. Tuck et al., filed on 28 Oct. 1991, and assigned U.S. Ser. No. 07/783,754;

Earth-Fixed Cell Beam Management for Satellite Communication System by David Palmer Patterson and Mark Alan Sturza, filed on 8 Jul. 1993 and assigned U.S. Ser. No. 08/088,714, and claiming the benefit of priority of a Parent Application entitled Beam Compensation Method for Satellite Communication System by David Palmer Patterson and Mark Alan Sturza, filed on 08 Nov. 1991 and assigned U.S. Ser. No. 07/790,318; and Spacecraft Antennas & Beam Steering Methods for Satellite Communication System by Douglas Gene Lockie et al., filed on 11 May 1994 and assigned U.S. Ser. No. 08/241,103, and claiming the benefit of priority of a parent application entitled Spacecraft Antennas & Beam Steering Methods for Satellite Communication System by Douglas Gene Lockie, filed on 28 Oct. 1992 and assigned U.S. Ser. No. 07/967,988 and claiming the benefit of priority of a Parent Application entitled Spacecraft Antennas & Beam Steering Methods for Satellite Communication System by Douglas Gene Lockie, filed on 8 Nov. 1991 and assigned U.S. Ser. No. 07/790,271.

FIELD OF THE INVENTION

The present invention relates to the field of satellites. More particularly, this invention provides methods of conveying and controlling a beam of radiated energy to or from a satellite orbiting the Earth in an orbit which is not an equatorial orbit at geosynchronous altitude. The present invention offers optimized frequency utilization and enhanced availability, capacity and reliability of remote sensing and communication services.

BACKGROUND OF THE INVENTION

Over the past few years, several satellite communication systems have been proposed. These systems are generally designed to enhance existing terrestrial cellular networks. Cellular telephone networks utilize fixed transmitting and receiving stations located in adjacent cells. Some of the satellite communication systems that will be launched later in this decade will rely on satellites operating in low Earth orbits. In cellular networks, the central transmitting and receiving antennas are stationary, and subscribers may communicate with one another while moving from cell to cell. A low Earth orbit network also allows subscribers to move, but the transmitting and receiving antennas aboard each satellite in the network are constantly in motion. Unlike some earlier communications systems which employed satellites in geosynchronous orbits, the spacecraft in low Earth orbit will move rapidly across the sky over any given place on the ground. Since the position of a low Earth orbit (LEO) satellite is not fixed with respect to a location on the ground, some LEO networks require complicated schemes for steering radio beams to users on the ground. Since each LEO satellite is only visible for a few minutes from the user's point of view, any communication through the network that lasts more than a few minutes must be handled by more than one satellite. The complex switching that is required to "hand-off" continuous communications service from one satellite to another imposes severe processing and power burdens on the LEO satellites.

One recent attempt to overcome the problem of providing a high capacity LEO communications system which ameliorates the burdens of complex switching due to frequent hand-offs between satellites is described in an allowed U.S. patent application Ser. No. 08/088,714 entitled Earth-Fixed Cell Beam Management for Satellite Communication System. This Application describes methods and apparatus which pertain to the allocation of radio beams which are generated by a constellation of satellites orbiting below geosynchronous altitude. These beams are precisely controlled so that they illuminate "Earth-fixed cells", as opposed to "satellite-fixed cells." In previous satellite communication schemes, spacecraft which are not held stationary over one particular location on the Earth in geosynchronous orbits fly over large regions of the Earth very rapidly. The radio beams generated by these fast moving spacecraft sweep across vast regions of the Earth's surface at the same rate of speed. If these beams were visible to the eye, they would paint bright circular and elliptical patches of light on the ground beneath the satellite which emitted them. In a system that employs satellite-fixed cells, the "footprint" of the radio beams propagated by the spacecraft defines the zone on the ground called a "cell" which is illuminated by the spacecraft. This satellite-fixed cell moves constantly as the spacecraft orbits around the globe.

In sharp contrast, an "Earth-fixed cell" is a stationary region mapped to an "Earth-fixed grid" that has permanent fixed boundaries, just like a city or a state. Although the rapidly moving satellites still shine their radio beams over the ground in rapidly moving footprints, the locations of the footprints at any given time do not determine the location of the unchanging Earth-fixed cells. The great advantage provided by using cells having boundaries that are fixed with respect to an Earth-fixed grid is realized when a subscriber being served by one satellite must switch to another beam in the same satellite or to a second satellite because the first is moving out of range below the local horizon. With satellite-fixed cells, this "hand-off" involves the assignment to the terminal of a new communication channel within the new beam or new satellite.

This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus substantially eliminating the "hand-off" problem.

The Earth-fixed cell method uses software that provides position and attitude information about each satellite in the constellation. Position data from this software enables each satellite to map the surface into an unchanging "Earth-fixed grid". Each satellite is capable of steering, transmitting and receiving beams conveying packets of information to the Earth-fixed grid. The beams are continually adjusted to compensate the effects of satellite motion, attitude changes, and the rotation of the Earth.

Unfortunately, many satellite communication and remote sensing systems that will be launched in the near future will rely on the more conventional method of utilizing satellite-fixed cells. Without the great benefits of an Earth-fixed cell method, a large portion of the microprocessor capabilities and power capacities of these systems will be diverted to internal switching tasks.

This problem of designing satellite systems which employ satellite-fixed cells but which avoid the deleterious effects of complex switching due to frequent hand-offs has presented a major challenge to the satellite business. The development of a high capacity satellite system which is capable of using satellite-fixed cells but which also minimizes hand-off overhead would constitute a major technological advance and would satisfy a long felt need within the communications and remote sensing industries.

SUMMARY OF THE INVENTION

The preferred embodiment of the present invention pertains to the management and allocation of radio beams which are generated by a satellite which moves with respect to the Earth's surface. The invention pertains to any satellite which is not in an equatorial orbit at geosynchronous altitude. The present invention reduces hand-off overhead in systems that utilize satellite-fixed cells, augments frequency re-use, and enhances the communications and sensing capacity of the satellite.

These goals are accomplished by partitioning satellite footprints into linear spanning cells and multiple linear segments. The linear spanning cells are areas that contain the satellite's track along the ground. They resemble long strips that extend across the entire footprint. Multiple linear segments are smaller contiguous areas that lie within the linear spanning cells. While the linear spanning cells are generally located so that their longest axis is colinear with the apparent direction of travel of the satellite over the Earth's surface at the nadir, the longitudinal axis of the linear spanning cells is actually slightly offset from the projection of apparent direction of travel of the satellite by a correction angle $\phi$. This correction angle compensates for the changing relative motion of the Earth's surface at various latitudes.

As a result of creating linear spanning cells and continually maintaining the cells in alignment with the satellite's track over the Earth's surface, terminals in the satellite's track remain within the spanning cells for approximately the entire time the satellite footprint passes over the terminal. This feature reduces the number of hand-offs as the satellite-fixed cells sweep over the terminal, augments frequency re-use, and enhances the communications and sensing capacity of the satellite.

An appreciation of other aims and objectives of the present invention and a more complete and comprehensive understanding of this invention may be achieved by studying the following description of a preferred embodiment and by referring to the accompanying drawings.

DETAILED DESCRIPTION OF PREFERRED & ALTERNATIVE EMBODIMENTS

Satellite & Geometry

Figure 1:
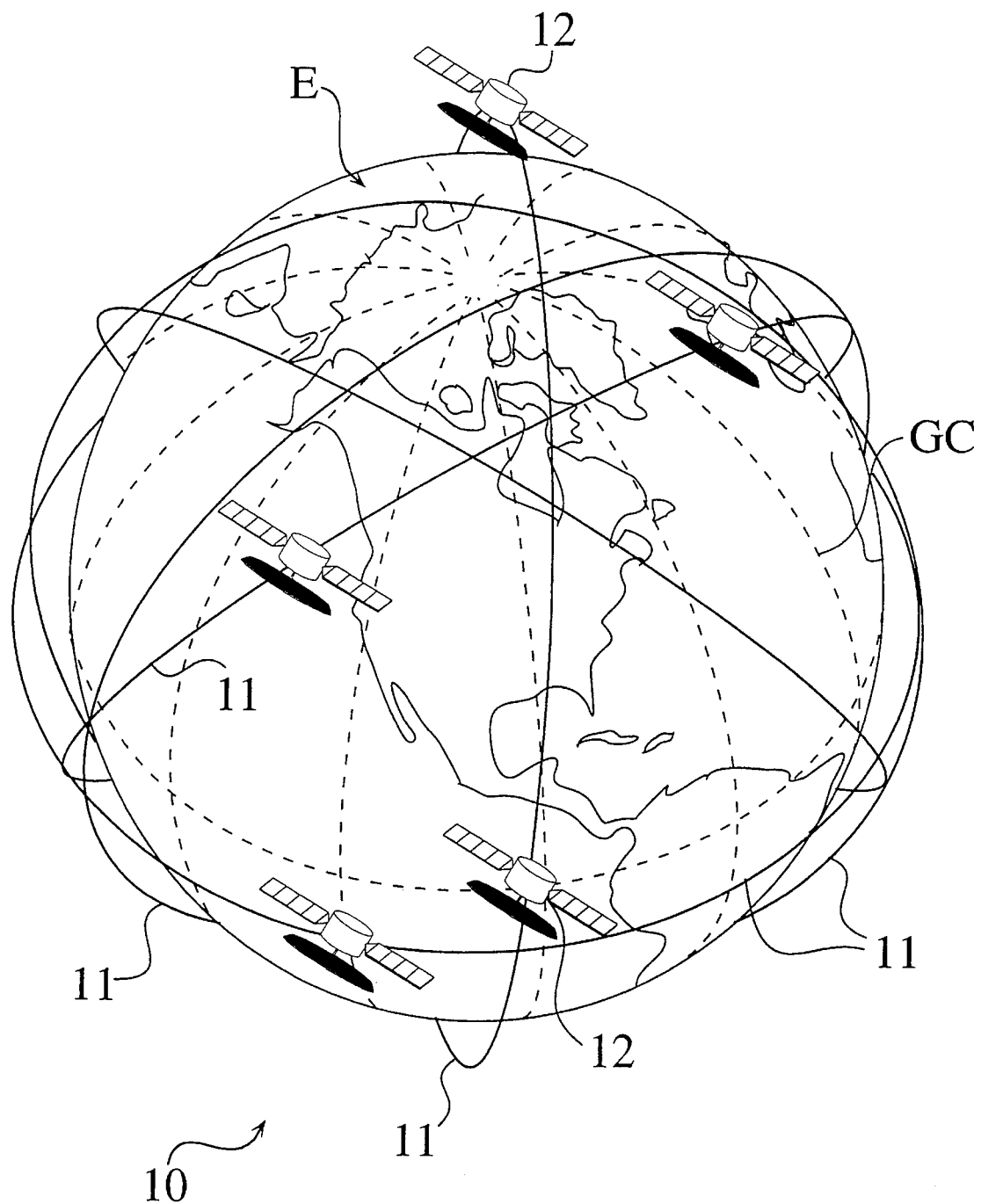
FIGS. 1 and 2 are schematic illustrations of the Earth and of satellites operating in orbits which are not equatorial orbits at geosynchronous altitude.
Figure 2:
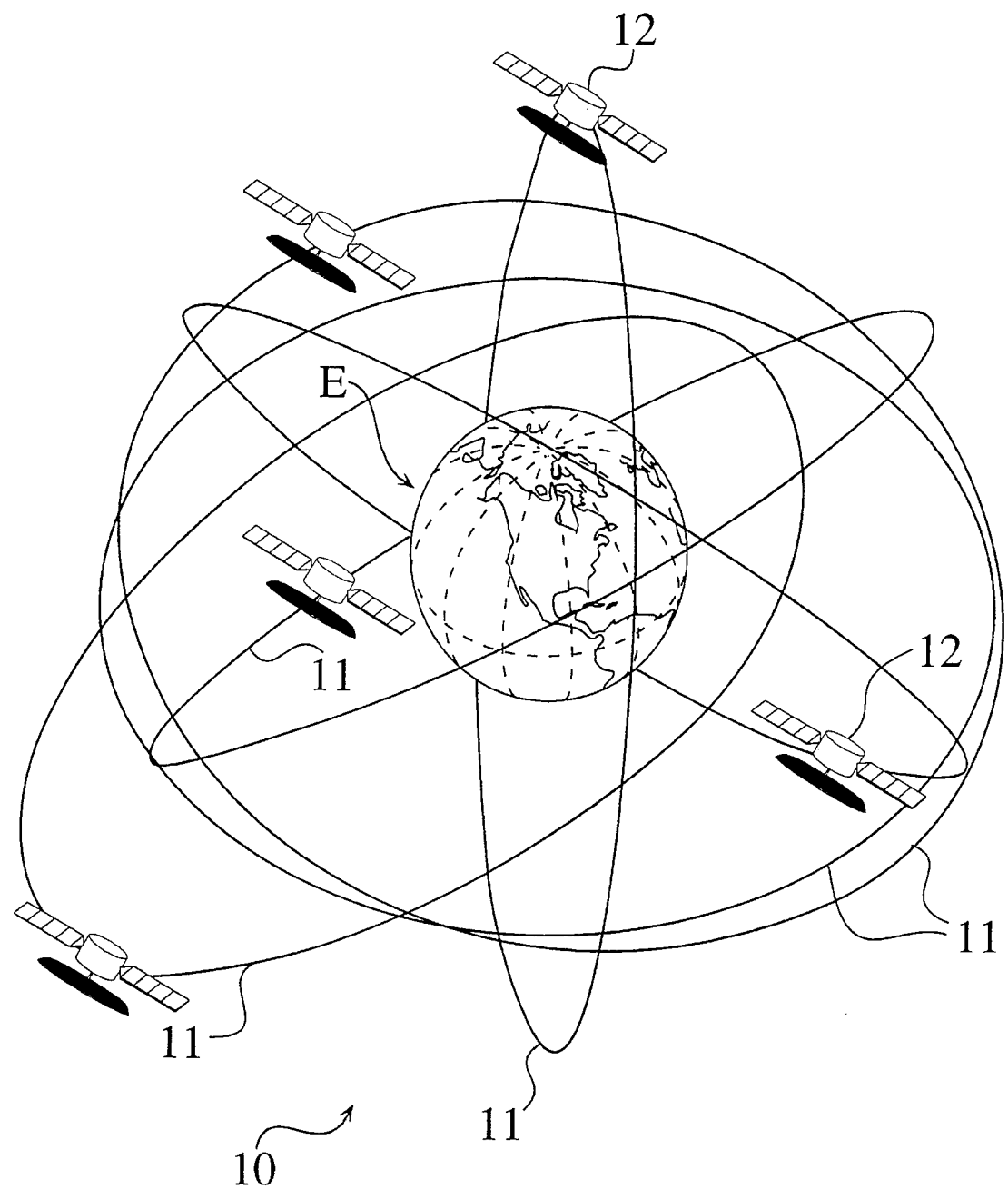

FIGS. 1 and 2 show a constellation 10 of satellites 12 circling the Earth E as they travel along polar, equatorial, or inclined orbits 11. FIGS. 1 and 2 also depict the Equator and several Great Circles. The present invention may be practiced using only one or many satellites 12. The present invention pertains only to satellites that use satellite-fixed cells, i.e., satellites that are constantly in motion with respect to the Earth. As a consequence, the orbits 11 shown in FIGS. 1 and 2 may be any orbit which is not an equatorial orbit at geosynchronous altitude. When used in this specification and the claims that follow, the term "orbit" refers to any trajectory of movement above the atmosphere of a celestial body, including circular and elliptical trajectories.

Figure 3:
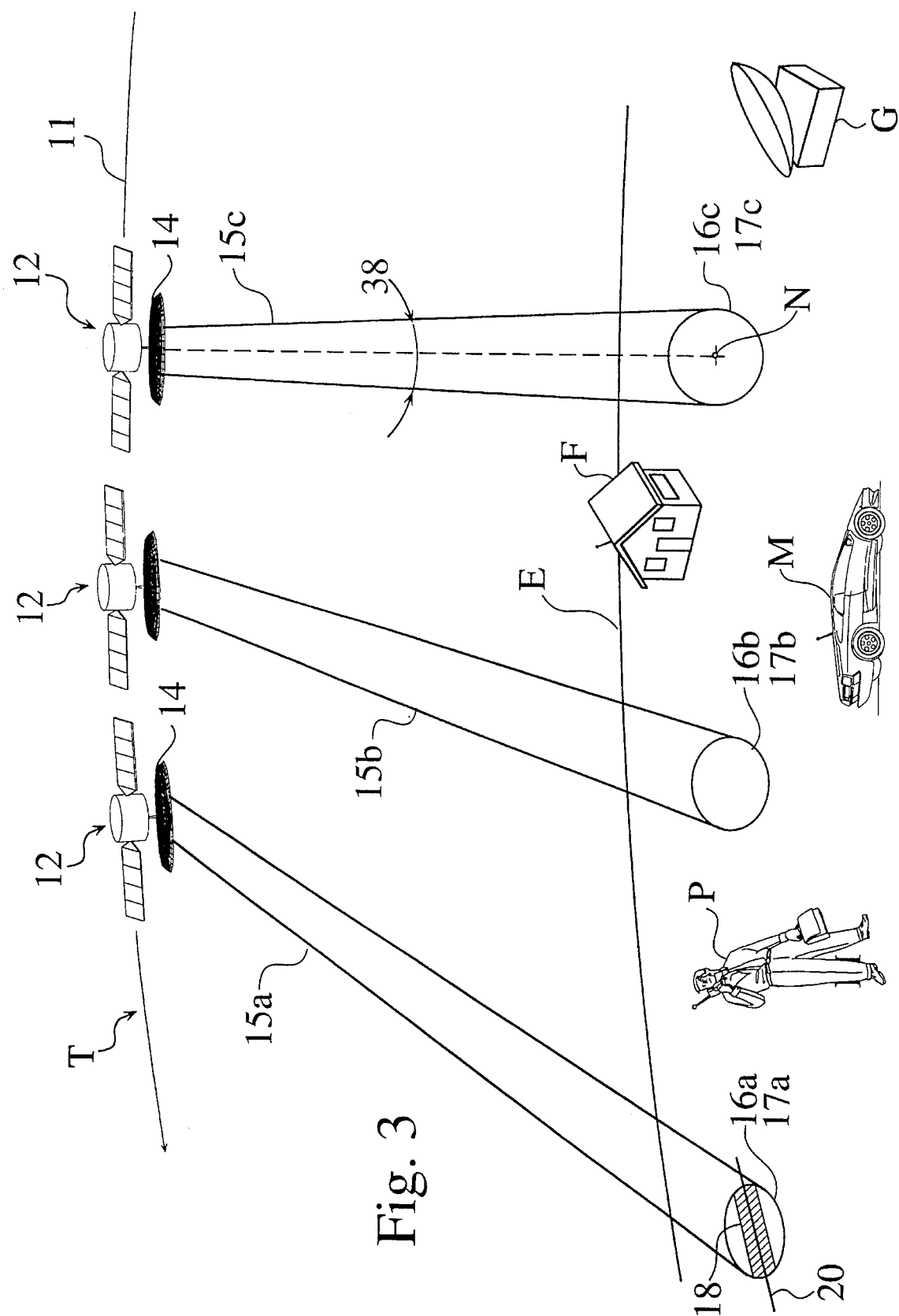
FIG. 3 reveals satellites in Earth orbit and the footprints they produce on the Earth's surface.

FIG. 3 exhibits three satellites 12 moving along an orbital pathway 11 above the Earth E in a direction of travel T. When the line defining the direction of travel T in orbit is projected down onto the Earth's surface, which is rotating West to East continuous line is formed on the surface at the satellite's nadir N. This line is called the satellite's track T'.

Each satellite 12 includes a radiation interface 14 which is capable of transmitting and/or receiving radiated energy 15a, 15b and 15c. The term "radiated energy" pertains to any form of energy, including a signal, which is transported from one position to another. Radiated energy includes all forms of waves and particles irrespective of wavelength, including electromagnetic and optical radiation.

If the satellite 12 is a communications satellite, the radiation interface 14 comprises transmit and receive antennas. If the satellite employed to practice the present invention performs remote sensing tasks, the radiation interface 14 comprises sensors or detectors. The spacecraft may also be used to direct some beneficial transmission toward the Earth E. Examples of such transmissions may include messages from a store-and-forward telecommunication system, compressed musical works for transfer to compact disks or illuminating radiation for a resource-mapping radar.

In one of the embodiments of the invention, the satellites 12 communicate with personal, mobile and fixed terminals P, M, F and gateways G on or near the surface. The word "terminal" is intended to encompass any device capable of sending or receiving radiated energy. Terminals include gateways. While most terminals are located on the Earth, they may be near the Earth, e.g., they may reside on an aircraft.

The area on the surface of the Earth that is illuminated by the radiated energy 15 emitted by a communications satellite 12 is known as the satellite's footprint 16. In the case of a remote sensing satellite, the interface 14 collects some form of radiation from an elliptical region on the surface of the Earth known as a "reception zone". A reception zone 17 defines the area at a given time which is "viewed" by a sensor aboard a satellite 12. A reception zone is substantially the same as a footprint 16, but a footprint 16 is defined by radiated energy 15 directed toward and impinging upon the Earth, while a reception zone 17 is defined by a surface on the Earth from which energy is radiated that may also be detected by a satellite at a particular instant. The three elliptical regions depicted in FIG. 3 may be either footprints 16a, 16b and 16c or reception zones 17a, 17b and 17c.

Figure 4:
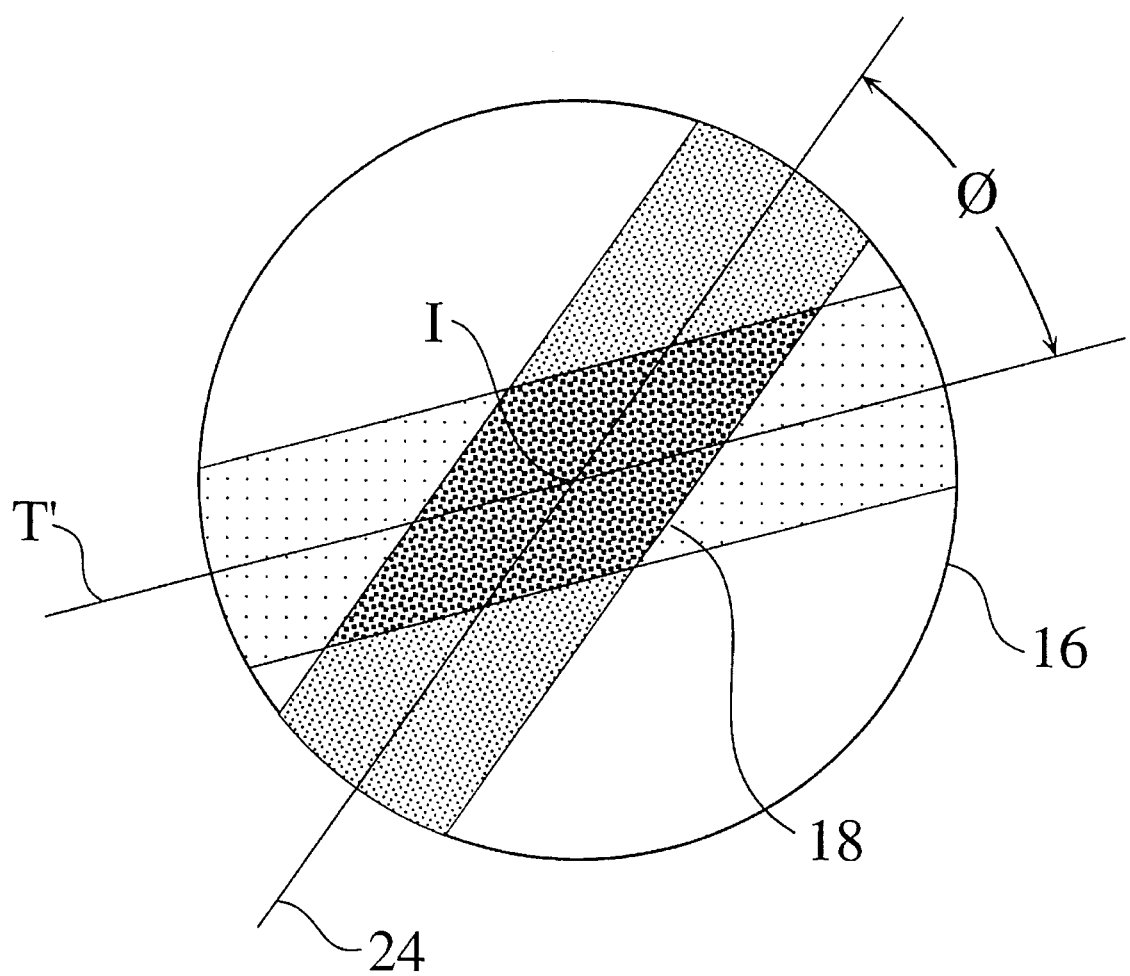
FIG. 4 is a schematic diagram that shows a single footprint and a single linear spanning cell. The alignment of the linear spanning cell has been corrected by an angle $\phi$ which compensates for the changing relative motion of the Earth's surface at various latitudes.

FIG. 4 exhibits a single footprint 16 containing a single linear spanning cell 18. In accordance with the present invention, each footprint 16 or reception zone 17 is mapped into long strips referred to as linear spanning cells 18 that extend across an entire footprint 16 or reception zone 17. Each cell 18 has two parallel sides along its longest dimension and a longitudinal axis 20 halfway between its two longest sides and parallel to them. The two relatively short sides of the cell 18 are colinear with an ellipse, because the boundary of the footprint 16 or the reception zone 17 which each cell 18 spans is always an ellipse itself.

A footprint 16 and any linear spanning cells 18 within it are constantly moving across the Earth's surface as the satellite 12 which creates the footprint 16 flies across the sky overhead. The instantaneous position of a linear spanning cell 18 relative to its footprint 16 is determined by the track T' of the satellite 12 over the ground and by a correction angle φ. The correction angle is chosen to align the satellite antenna's longitudinal axis with the satellite's motion over the Earth's surface. If the Earth were not turning, no correction would be needed.

FIG. 4 shows the instantaneous positions of both an uncorrected and a corrected linear spanning cell extending across a footprint 16. The uncorrected linear spanning cell 18 is lightly shaded, and is centered along the line marked by reference character T'. The linear spanning cell which has been aligned by altering its position by correction angle φ is heavily shaded, and is centered along the line marked by reference character 24. The correction angle φ is measured at the intersection I of the satellite track T' and the protection of the direction T of the satelite's orbit 11, line T'. For the sake of clarity, the magnitude of the correction angle φ has been exaggerated in FIG. 4.

Figure 5:
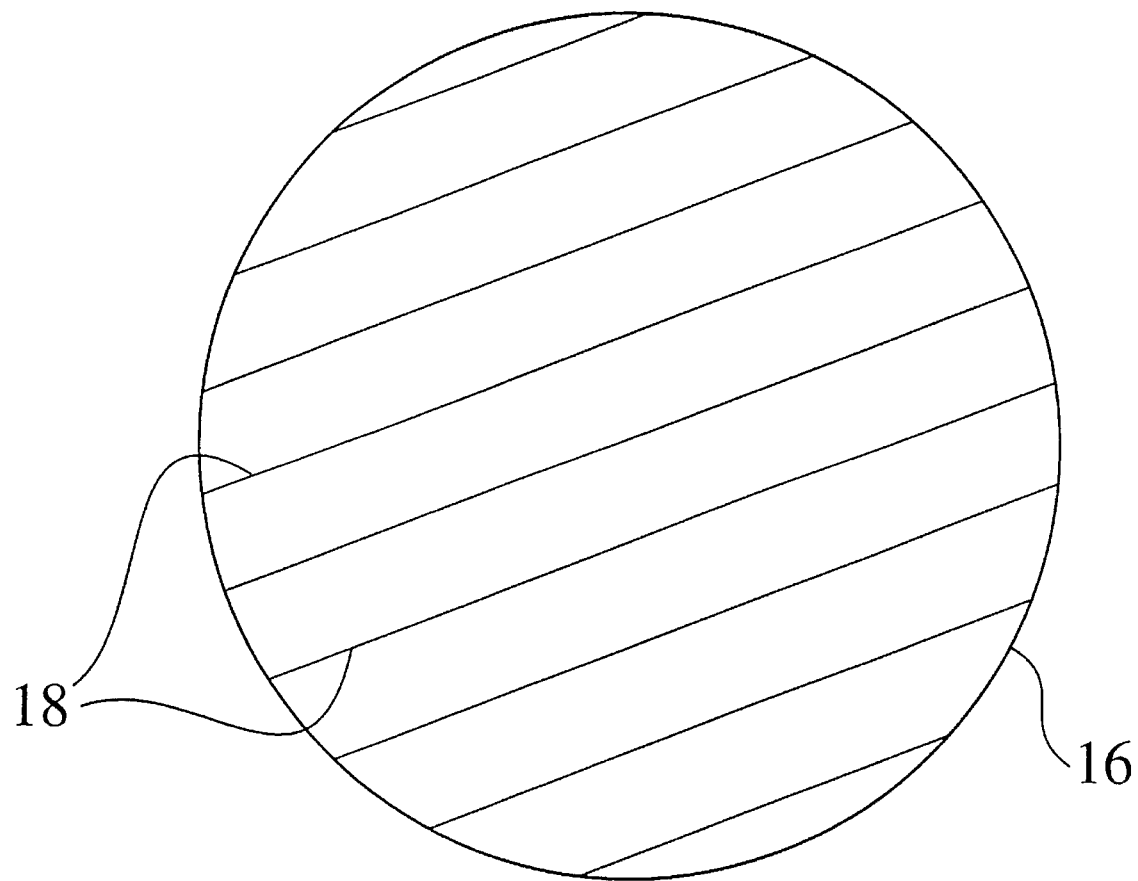
FIG. 5 is a schematic diagram that reveals a single footprint and several linear spanning cells.
Figure 6:
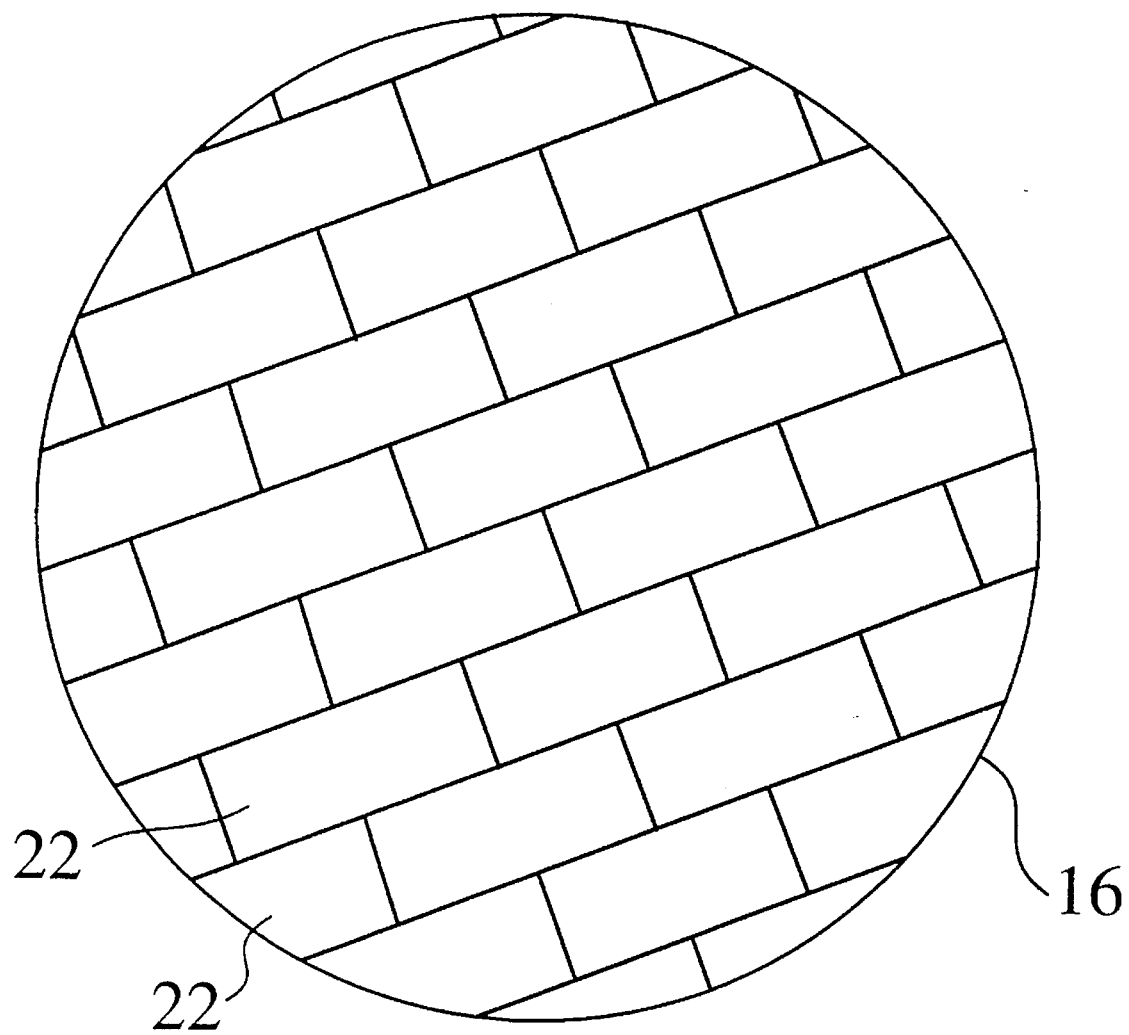
FIG. 6 presents another schematic diagram showing a single footprint, several linear spanning cells and a number of multiple linear segments within each linear spanning cell.

FIG. 5 portrays a footprint 16 containing a number of linear spanning cells 18, while FIG. 6 portrays both linear spanning cells 18 and multiple linear segments 22 within a footprint 16 (or reception zone 17).

Calculating the Correction Angle φ

The following discussion concerns the derivation of the appropriate correction angle φ based on the satellite's latitude. The derivation applies to the special case of a near-polar orbit.

If the longitudinal axis of the cell is parallel to the orbital plane of the satellite (which is fixed in space, and does not rotate with the Earth), and the Earth is turning under the satellite 12 as it proceeds in its orbit 11, from the point of view of an observer on Earth the satellite's track T' is not parallel to the lines of longitude, but lies at a small angle to them. This small angle, called the "correction angle" and represented by the variable φ, varies from about four degrees at the Equator to zero at the poles. A graph 200 of the correction angle φ 202 versus latitude 206 is presented in FIG. 7. The angle φ reverses when the satellite 12 passes over a pole. As a result, the terminal appears to move across the cell. If the linear spanning cells 18 are one degree of latitude (about 115 km) wide, and the satellite is in a near-polar orbit with an altitude of about 700 km, the terminal will seem to move about ¾ of the way across the cell 18 in the cell's three minute dwell time at the Equator, decreasing toward the poles. (The dwell time is the period of time the satellite imprint spends on a given point on the Earth's surface.)

This phenomenon will increase handoff activity, since about half of the terminals will have to change cells from this cause in their three minute dwell time. As described above, this problem can be substantially eliminated by swinging the cell pattern a few degrees in each direction during the satellite's orbit. This compensation may be accomplished using a slow mechanical movement of the antenna or an electrical means, depending on the antenna design, and is described in complete detail below.

In the equations that follow, the frame of reference is the "fixed stars", i.e., a reference frame based on inertial space. The Earth is turning on its axis and satellites are moving in their orbits with respect to this frame of reference. Since the orbits of satellites of Earth move through space with the Earth's center of mass, we have assumed for convenience that the frame of reference moves with the Earth in its orbit.

The surface of the Earth E as seen from this frame of reference moves from West to East. The velocity is highest at the Equator, and decreases in proportion to the cosine of the latitude to zero at the poles. Because one nautical mile (about 6076.1 feet) is defined as one minute of longitude at the Equator, it is very convenient in the following analysis to work in nautical miles and in nautical miles per hour (knots).

The surface velocity of the Earth at a latitude L, $V_s(L)$, in knots, as seen by a distant observer in the reference frame is always from West to East, and is given by Equation One:

$$V_s(L) = \frac{360 \times 60}{24} \cos(L) \qquad \text{(Equation One)}$$

Where

L is the latitude in degrees of the point on the Earth's surface at which the velocity is being measured.

Figure 8:
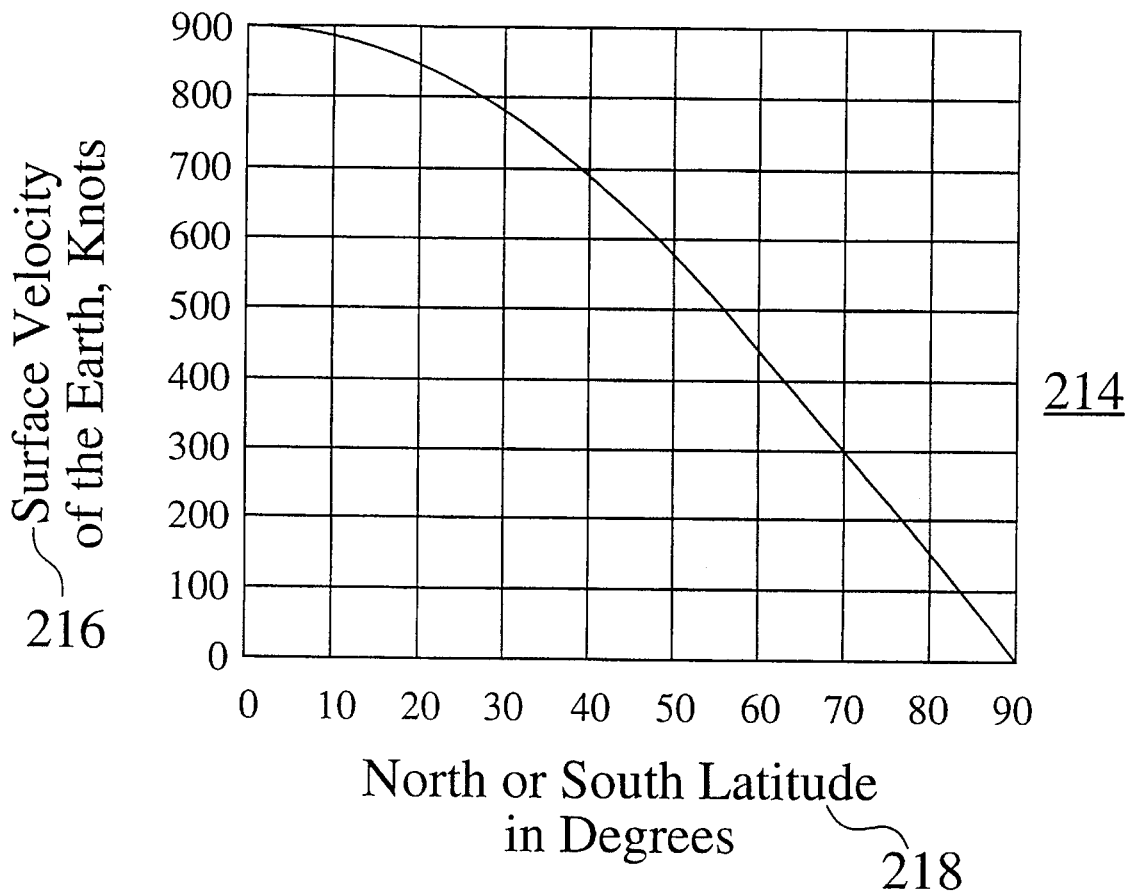

A graph 214 of the Earth's surface velocity 216 as a function of North or South latitude 218 is shown in FIG. 8.

In the simple case of a circular polar orbit (an orbit of constant altitude which passes over both the North Pole and the South Pole), the motion of the satellite is always at right angles to the motion of the Earth's surface, and, assuming a spherical Earth, the orbital period may be found using Equation Two:

$$\tau = \frac{2\pi}{60} \sqrt{\frac{(r_e + h)^3}{GM}} \qquad \text{(Equation Two)}$$

Where t is the period of orbit $r_e$ is the radius of the Earth, i.e., 6378.165 km;

h is the orbital altitude in km; and

GM is the Earth's mass times the gravitational constant, $G = Km^3 s^{-2}$, $GM = 398,603.2$.

For a satellite 12 in low Earth orbit at 700 km, $\tau = 98.773$ minutes. (This is the orbital period, i.e., the times it takes for the satellite to travel completely around the Earth.)

The orbital velocity of a satellite in a circular orbit is given by Equation Three:

$$V_o = 360 \frac{60 \times 60}{\tau} \quad \text{(Equation Three)}$$

For a satellite in a 700 km orbit, the orbital velocity is then $V_o = 1.312 \times 10^4$ knots.

The motion of the satellite's nadir across the surface of the Earth is the vector sum of the satellite's velocity and the Earth's surface velocity. At any given latitude, the angle at which the Earth's surface is moving with respect to the direction of the satellite's motion in the inertial reference frame is the angle portion of that vector sum. If the satellite 12 is moving Northward in its orbit, and the orbit is at a small angle to the Earth's axis, the Earth's surface will move from left to right below the satellite, and to fit that motion, the satellite's radiation pattern must be aligned in a Northwest-Southeast direction. As the satellite approaches the North Pole, the necessary angle of the correction decreases, and is zero when directly over the North Pole NP. As the satellite proceeds Southward, the correction angle must swing to the satellite's right, to a Southwest-Northeast alignment, since West is now on the satellite's right. The correction angle reaches a maximum as the satellite crosses the Equator. The angle then decreases to zero as the satellite crosses the South Pole SP, reversing to a Northwest-Southeast alignment after the South Pole SP is crossed.

The discussion presented below utilizes the navigator's convention that True North is zero degrees, with the direction angle increasing as direction changes toward the East. In other words, the angle of direction changes from zero degrees through 360 degrees as the compass needle moves clockwise from the starting point of True North.

The correction angle, $\phi(L)$, which is the angle of the motion of the Earth's surface with respect to the satellite at latitude L, may be determined using Equation Four:

$$\phi(L) = 90 - i - \arctan \frac{V_s L(\omega)}{V_o} \quad \text{(Equation Four)}$$

Where $V_o$ is the orbital velocity of the satellite;

i is the orbital inclination, i.e., the angle measured between the plane containing the satellite's orbit and the plane containing the Earth's Equator;

$\omega$ is the argument of perigee, i.e., the satellite's orbital position as given by the number of degrees of a 360-degree orbit it has traveled since crossing the Equator in a Northbound direction; and $L(\omega)$ is the latitude of the satellite at argument of perigee $\omega$. $L(\omega)$ is equal to 107 for satelites in polar orbits, for a value of $\omega$ of ninety degrees or less.

Figure 7:
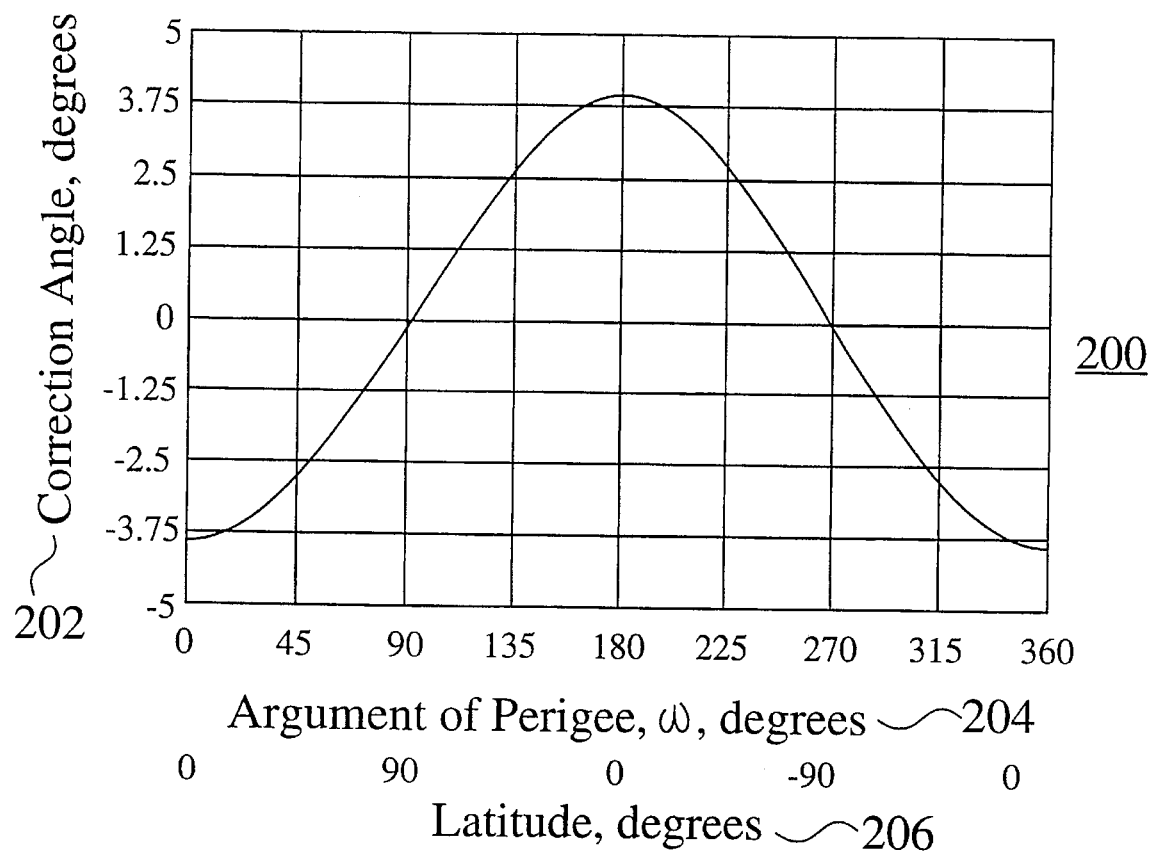
FIGS. 7, 8 and 9 supply graphs which illustrate the functional relationships of the correction angle versus argument of perigee for a near-polar orbit, surface velocity versus latitude and latitude of nadir versus argument of perigee for an inclined orbit.

The graph 200 presented in FIG. 7 was generated using a value of i of ninety degrees, which corresponds to a "pure" polar orbit. In the case of a polar orbit, the latitude of the satellite's nadir is the same as its orbital position. Consequently, for the special case of a satellite in polar orbit, $L(\omega) = \omega$ from the Equator to the North Pole.

For this polar orbit, the correction angle varies as the satellite 12 makes one complete orbit as shown in FIG. 7. This figure presents data for a Northbound satellite in a circular polar orbit starting at the Equator (latitude =0 degrees, $\omega = 0$ degrees), proceeding Northward to the North Pole (latitude=90 degrees, $\omega = 90$ degrees), then Southward to the Equator (latitude again 0 degrees, $\omega = 180$ degrees), continuing Southward to the South Pole (latitude=−90 degrees, $\omega = 270$ degrees), and finally Northward again to the Equator (latitude=0 degrees, $\omega = 0$ degrees). Negative angles indicate motion to the left of the satellite as it proceeds in its orbit, while positive angles indicate motion to the right.

For a satellite in an inclined orbit, the satellite's nadir never reaches the pole, so that the maximum latitude is less than ninety degrees. The latitude of the nadir can be found at any moment from Equation Five:

$$\sin(L) = \sin(i) * \sin(f + \omega)$$

where

L is the latitude of the nadir;

i is the inclination of the orbit;

f is a very small anomaly which may be ignored for the purposes of this calculation; and $\omega$ is the argument of perigee of the satellite.

Figure 9:
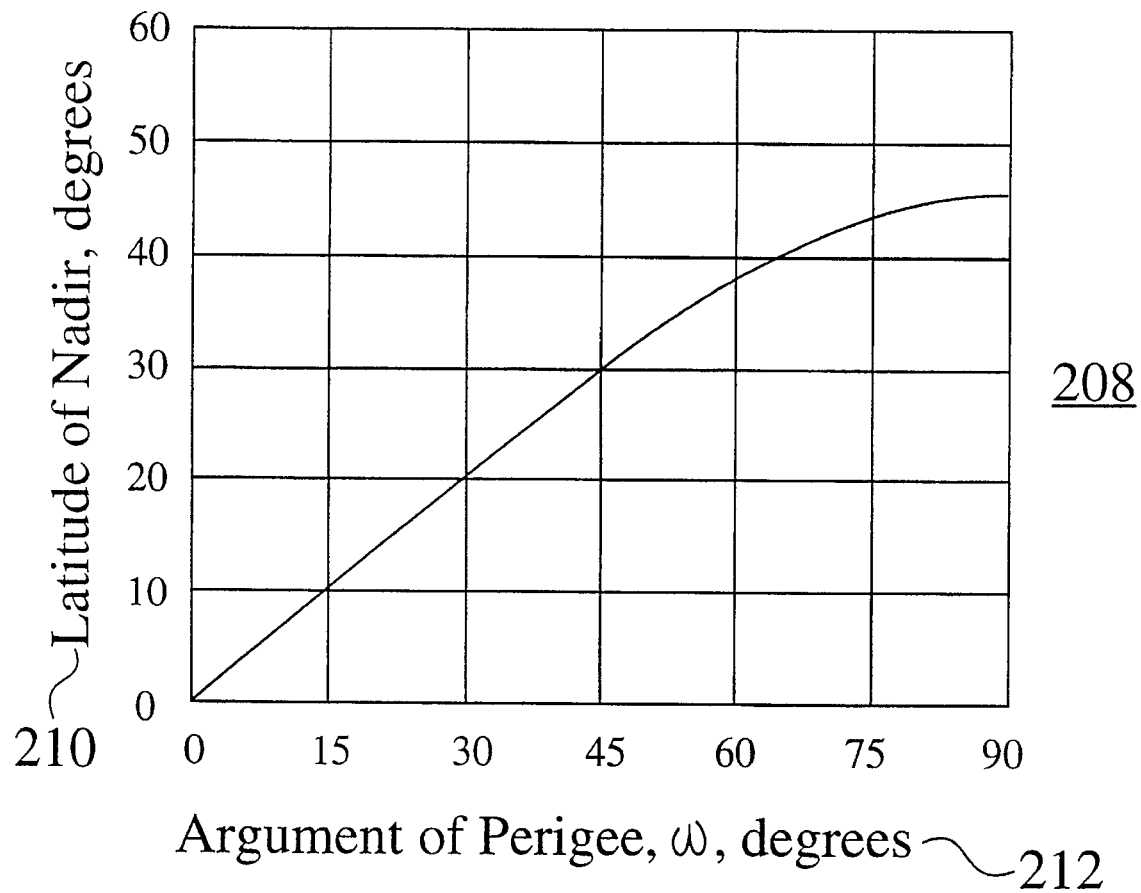

The graph 208 depicted in FIG. 9 is based on Equation Five and plots the latitude of nadir 210 versus the argument of perigee 212 for a satellite in an inclined orbit. Using the Correction Angle $\omega$ to Point the Satellite Antenna: A Preferred Method Employing a GPS Receiver Once the correction angle $\phi$ has been determined, the correct angle of the antenna with respect to the body of the satellite 12 must be ascertained. Other information that is required includes the relative speed and direction of the satellite, and the direction of the Earth's surface at the nadir.

The preferred method of acquiring the needed information employs a navigation receiver on the satellite 12 which receives and interprets the signals of the Global Positioning System ("GPS"). Such receivers are readily available from a number of manufacturers. Thousands of personal versions of GPS receivers are produced each month by companies such as Magellan™ and Garmin™. Space-qualified versions are produced by companies such as Interstate Electronics™, Motorola™ and Rockwell International™. These receivers provide continuous information on their position with respect to the Earth's surface, already corrected for the Earth's motion, and all such receivers either provide or can readily be adapted to provide, an output signal which roves a continuous value of the receiver's speed and direction with respect to the Earth's surface. The satellite 12 which is used to implement the present invention will include attitude sensing and stabilization mechanisms that supply an output signal which rove a continuous value of the receiver's speed and direction with respect to the Earth's surface. Other systems on board the satellite 12 will contain attitude sensing and stabilization mechanisms which furnish an output signal proportional to the orientation of the satellite's structure with respect to its direction of motion. These two signals can be added or subtracted to give a signal directly proportional to the relative angle of the satellite's body to the satellite's direction of motion over the Earth's surface. The antenna can then easily be rotated by a conventional servomechanism to place its long axis in line with that direction of motion.

Figure 10:
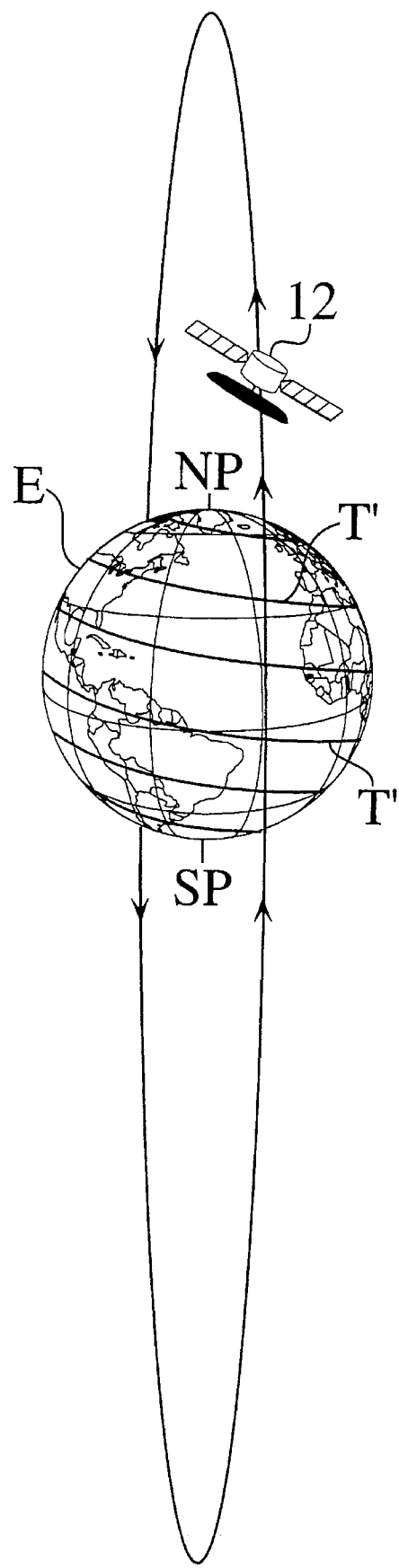
FIG. 10 is a schematic illustration of a satellite in Earth orbit. This figure also portrays the satellite's track on the Earth, which resembles a spiral.

FIG. 10 is a schematic depiction of a satellite 12 in a ten day polar orbit. The track of the satellite on the ground appears as a spiral T'.

Figure 11:
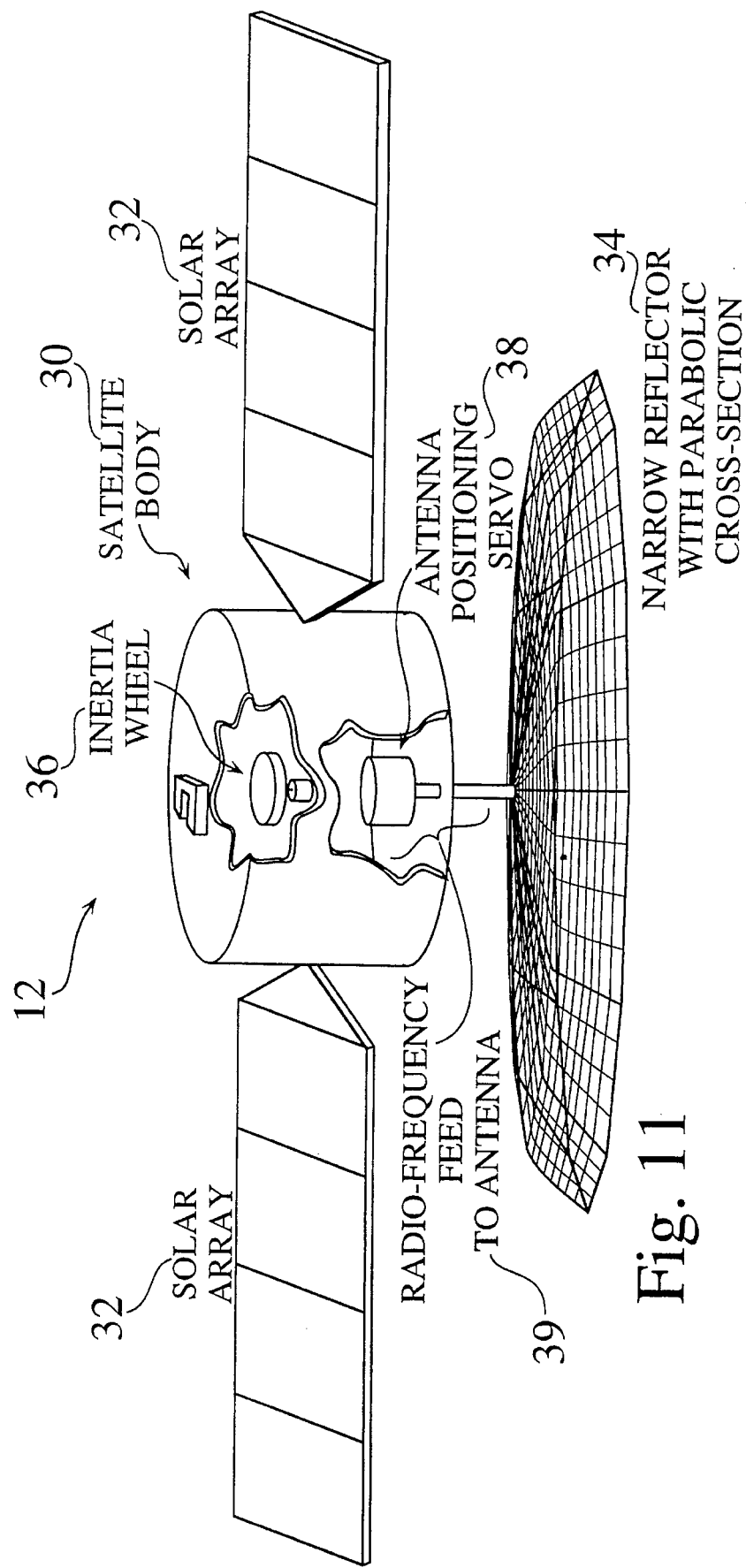
FIG. 11 is a perspective view of a satellite which is designed for use with the preferred embodiment of the invention.

FIG. 11 reveals one of many satellite designs that may be utilized to realize the benefits of the present invention. The satellite 12 comprises a body 30, a solar array 32 and an antenna 34 which includes a narrow reflector with a parabolic cross-section. The internal components of the satellite 12 include an inertia wheel 36, an antenna positioning servo 38 and a radio-frequency feed to antenna 39.

Figure 12:
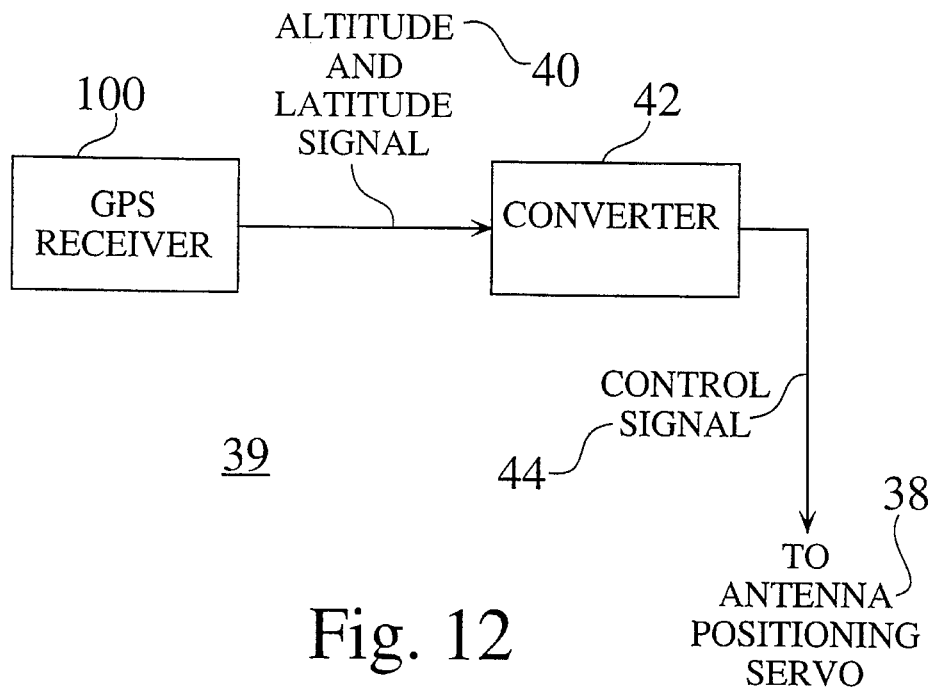
FIGS. 12, 13, 14, 15 and 16 are schematic block diagrams of components aboard the satellite shown in FIG. 11 which are employed to practice the present invention.
Figure 13:
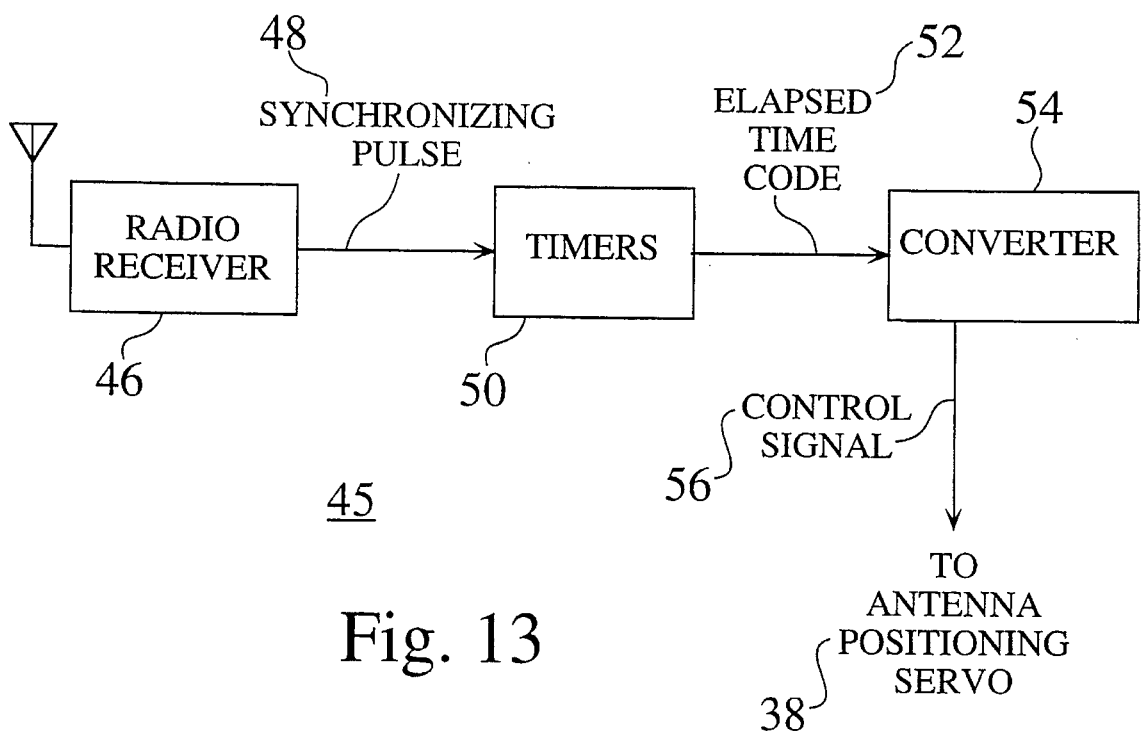

FIGS. 12 and 13 are schematic block diagrams 39 and 45 depicting generalized groups of electronic circuits aboard the satellite 12. FIG. 12 shows a GPS receiver 100 which produces an output that includes an altitude and latitude signal 40. This signal is fed to a converter 42 which, in turn, produces a control signal 44 that governs the action of an antenna positioning servo 38. The GPS receiver 100 is described in great detail in the text which follows and in FIG. 16.

FIG. 13 shows an alternative circuit that includes a radio receiver 46 which produces a synchronizing pulse 48 that is fed to timers 50. The timers 50 generate an elapsed time code 52 which is supplied to a converter 54. The converter emits a control signal 56 which directs the action of an antenna positioning servo 38.

Figure 14:
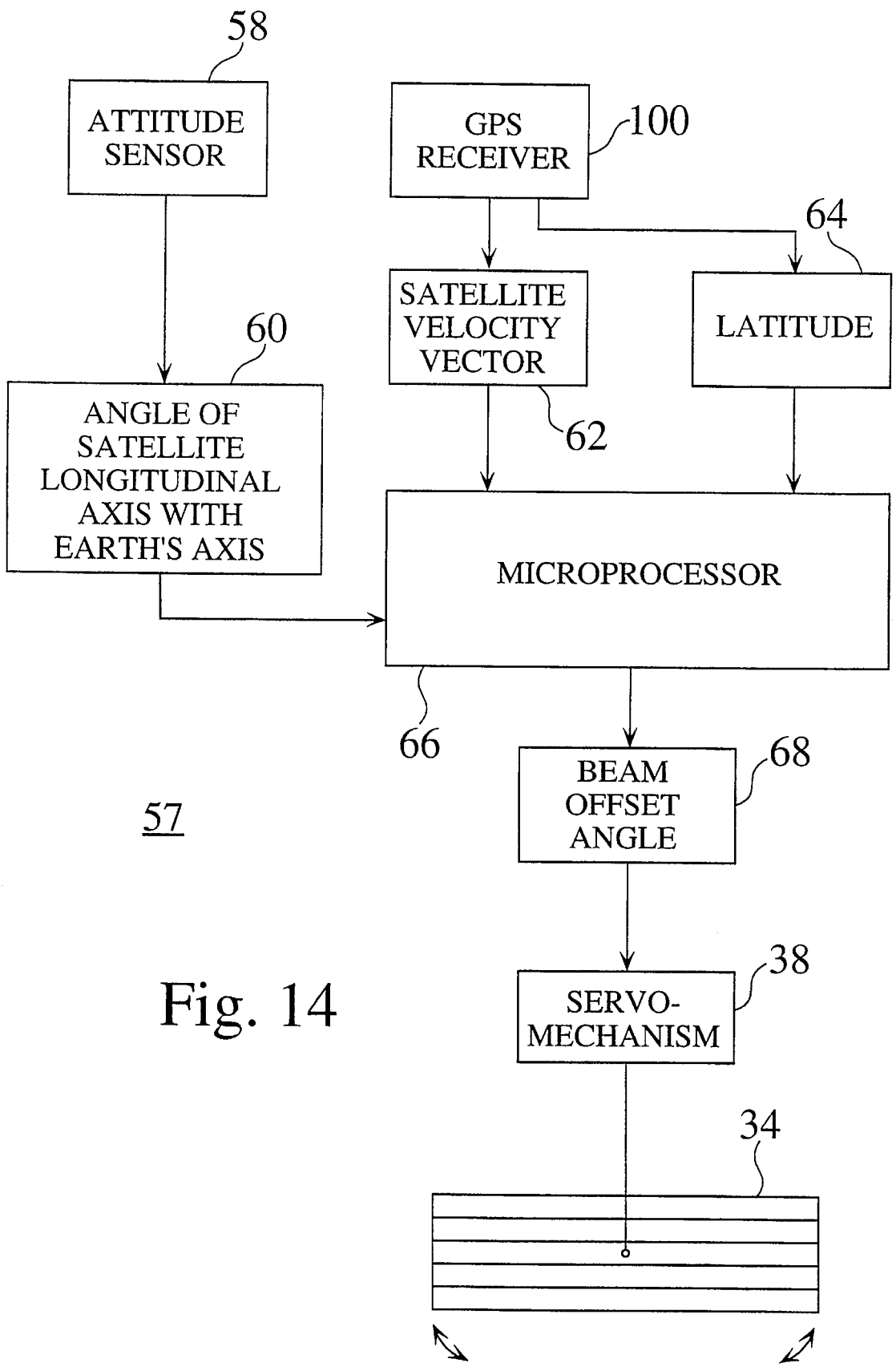

FIG. 14 is a schematic block diagram 57 that portrays the GPS receiver 100 and accompanying electronic components in greater detail. The GPS receiver 100 generates two digital signals. The first signal comprises a number which is the speed of the satellite over the Earth's surface, and an angle which is the angle between the satellite's velocity and the underlying meridian of longitude. These quantities are components of the satellite's velocity vector, represented as box 62 in FIG. 14. The second digital signal is the latitude of the satellite's nadir, shown as box 64 in FIG. 14.

A microprocessor 66 receives these two signals 62 and 64 from receiver 100, in addition to the angle of the satellite's longitudinal axis with respect to the Earth's axis 60 which is supplied by an attitude sensor 58. The microprocessor 66 multiplies the vector constant equal to the surface velocity of the Earth's Equator by the cosine of the latitude. This product yields the vector of the surface velocity at the satellite's nadir, $V_n$. The microprocessor 66 also calculates the resultant of the satellite velocity vector and the surface vector $V_n$. The angle portion of this resultant, corrected by the angle of the satellite's longitudinal axis with the Earth's axis, is the beam offset angle 68. This beam offset angle 68 is fed to a servo-mechanism 38, which rotates the antenna array 34 so that its long dimension makes the beam offset angle 68 with the direction of the satellite's motion.

Figure 15:
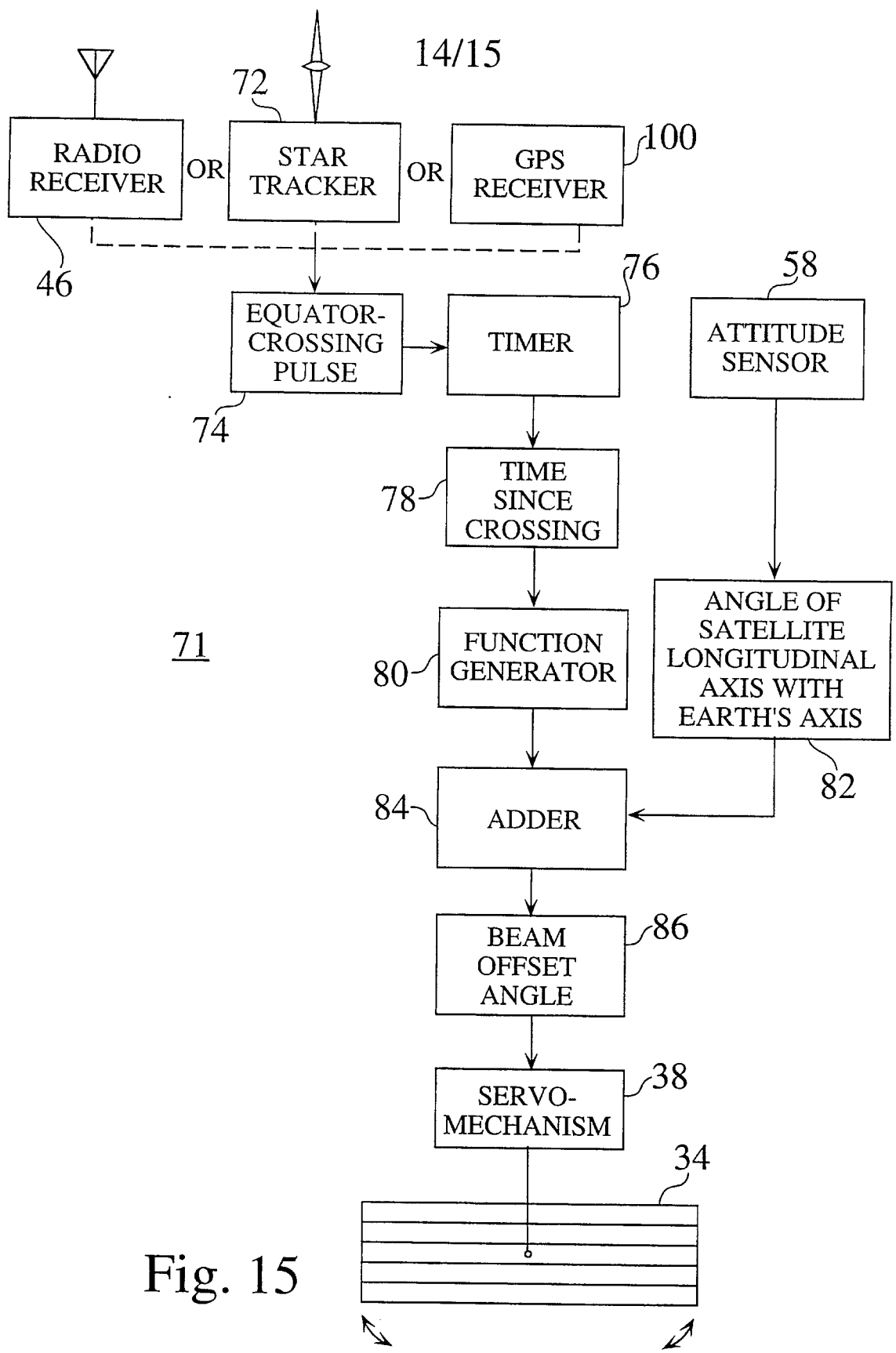

FIG. 15 offers another schematic block diagram 71 that is specifically designed for use with satellites 12 that travel in circular orbits at a constant altitude. A radio receiver 46, a star tracker 72 or a GPS receiver 100 may be utilized to generate an Equator-crossing pulse 74 which resets a timer 76. The timer 76 sends a "time since crossing" ($\tau_c$) signal 78 to a function generator 80. The $\tau_c$ signal 78 is proportional to the time that has elapsed since the satellite 12 crossed the Equator. The function generator 80 includes a memory which stores a quantity $\tau_{1/2}$, which is the time it takes the satellite to complete one half of its orbit around the globe, and also stores the satellite's velocity vector. The function generator output is equal to the angle of the satellite's apparent motion over the Earth's surface, taking into account the surface velocity of the Earth at the satellite's nadir. The surface velocity, V', is the velocity at the Equator, V, in Equation Seven:

$$V' = V \cos £$$

where £ is the latitude at the satellite's nadir.

The latitude in this case can be set equal to:

$$180 \frac{\tau_c}{\tau_{1/2}} \phi$$

since the cosine function interprets angles over ninety degrees. An adder 84 algebraically sums the correction angle from the function generator's output with the actual offset of the satellite's longitudinal axis with respect to the Earth's axis 82 and its direction of motion with respect to the Earth's axis. The result is the beam offset angle 86, which is used to a control servo-mechanism 38 that points the satellite antenna 34.

Figure 16:
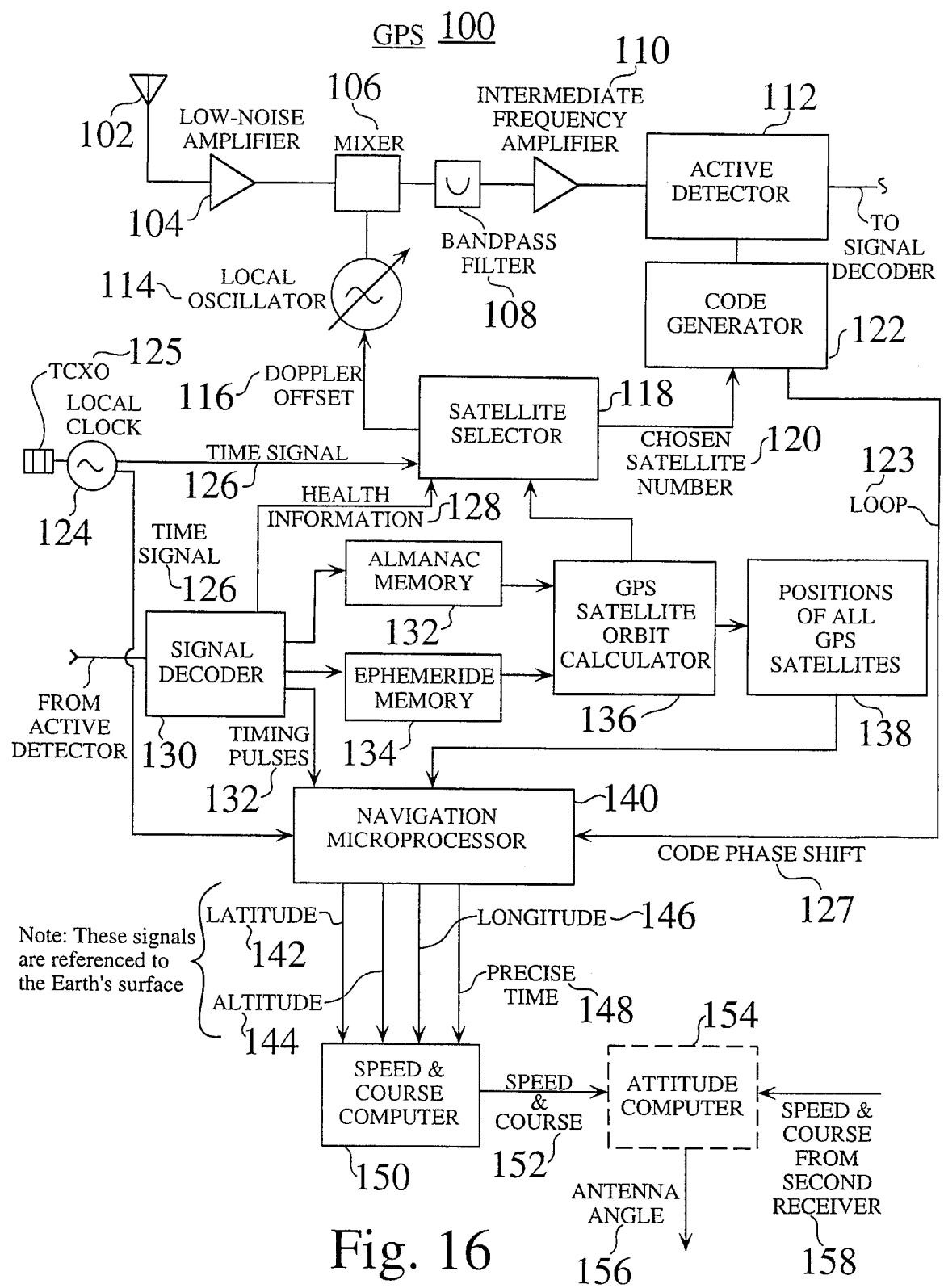

FIG. 16 is a schematic block diagram 100 of the internal components and functions of a GPS receiver. In general, the GPS receiver is a superheterodyne with a voltage-controlled local oscillator. The existing constellation of GPS satellites use a code-division modulation scheme (like CDMA), which allows all of the GPS satellites to use the same bandwidth segment. Signals from different GPS satellites are detected by matching them with a code that is peculiar to each satellite. This function is performed by an active detector 112, which receives an input from an antenna 102 through a low-noise amplifier 104, a mixer 106, a band-pass filter 108 and an intermediate frequency amplifier 110.

A satellite selector 118 uses an algorithm to pick a set of GPS satellites, usually four, which are in view and whose positions are widely-enough spaced to provide a good navigation solution. The satellites chosen by the selector 118 are indicated by arrow 120 in FIG. 16. The satellite selector 118 bases its selection on satellite position information from the almanac memory 132 and a present-time signal 126 from the local clock 124. The local clock 124 is connected to a temperature-compensated crystal oscillator ("TXCO") 125. All the internal timing signals used in the GPS satellite are derived from the TXCO 125. The selector 118 then passes the satellite's identity to the code generator 122, which generates the appropriate code for the desired satellite. This code is shifted in phase with respect to the local clock 124 until it matches the received signal code as determined by the active detector 112. This condition is maintained by a code tracking control loop 123.

Since the GPS satellites are moving rapidly, the satellite selector 118 also calculates the frequency offset 116 of each satellite due to Doppler shift, and adjusts a local oscillator 114 to place the satellite's signal in the receiver's passband.

The detected signal from the satellite is a bitstream which contains a fragment of the almanac 132, the satellite's ephemerides 134, a health bit 128 and another administrative information, and very precise time marks. This bitstream is separated into its components by a signal decoder 130.

A GPS satellite orbit calculator 136 uses the almanac 132 and ephemeride 134 information and Kepler's equations to calculate the position 138 of each chosen GPS satellite in its orbit with a precision of a few meters. This information is transmitted to the satellite selector 118 and to the navigation microprocessor 140.

The navigation microprocessor 140 receives a timing signal from the local clock 124 and a timing signal from each satellite for each chosen satellite. Since the speed of radio signals is a known constant, the navigation computer 140 can calculate the distance to each chosen satellite. Because the local clock 124 is not highly accurate, these ranges are in error, and are called "pseudo-ranges". These pseudo-ranges are measured utilizing the code phase shift 127 provided by the code generator 122 over loop 123.

If four satellites were chosen by the selector 118, the navigation computer 140 has four pseudo-ranges. If, however, the ranges were accurate, three would be sufficient to find an exact position. To find an exact solution, the computer solves a system of four equations in four unknowns: latitude 142, longitude 146, altitude 144 and the local clock error. The result is a position 142, 144 & 146 and precise time 148 output. The algorithms used in these calculations make allowance for the Earth's rotation, so that the position found is a point on the Earth's surface.

In a commercial GPS receiver, positions are generated frequently, usually at intervals of a second or less. The receiver utilizes the most recent two or three positions and their associated times to calculate speed and direction of motion with respect to the Earth's surface. This task is accomplished in the speed and course computer 150.

The speed and course output 152 can be combined with knowledge of the orientation of the body of the satellite to its direction of motion, which is derived from an attitude computer 154, to determine the appropriate pointing angle 156 of the antenna 34.

Alternatively, two GPS receivers can be employed, separated by several feet on the satellite's structure. The satellite's attitude and any rotation of its structure can be then be determined by comparing the positions of the two receivers 100 and 158.

Alternative Methods Pointing the Satellite Antenna

In an alternative embodiment of the invention, the satellite is furnished with information describing its velocity with respect to the Earth's surface from an Earth-based radar system. This information can be combined with information from the satellite's attitude-sensing equipment to generate an antenna pointing signal.

Another alternative utilizes circuits aboard the satellite that generate a continuous relative-velocity signal. An onboard computer is used to continuously solve Kepler's equations for the satellite's orbit and adds the Earth's motion, derived from the latitude of the nadir as calculated above. The computer is updated periodically by an Earth-based signal which provides the ephemerides of the satellite's orbit from radar or visual observations.

Yet another alternative incorporates a method that is useful for a satellite in a stabilized circular orbit. A device onboard the satellite is programmed with the equation of its fixed orbit. The output signal of the device is the relative velocity and angle of the satellite's course over the Earth's surface. The device receives synchronizing pulses periodically (as a practical matter, as infrequently as monthly for some orbits) from radar or visual sightings. The resulting information, which for such an orbit repeats itself each orbit, and which in principle can be generated by a mechanism as simple as a cam can be used to point the satellite antenna.

It can be seen that by pointing the satellite radiation interface 14 to maintain the linear spanning cells 18 in alignment with the satellite's track T' over the Earth's surface, a terminal P, M, G in the satellite's track T' remains (dwells) within a linear spanning cell 18 for approximately the entire time the satellite footprint 16 passes over the terminal P, M, G. The dwell time of a terminal P, M, G within the track-aligned, linear spanning cell 18 is many times longer than the dwell time of a terminal P, M, G in a hexagonal, circular or elliptical shaped satellite-fixed cell created by known satellites in comparable orbits. Even when the linear spanning cell 18 is subdivided into multiple linear segments 22, a terminal P, M, G dwells for more than two times longer than in a satellite-fixed cell created by known satellites in comparable orbits. This feature reduces the number of hand-offs as the satellite-fixed cells 16 sweep over a terminal P, M, G, thereby augmenting frequency re-use, and enhancing the communications and sensing capacity of the satellite 12.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the claims that follow. The various orbital parameters and satellite designs that have been disclosed above are intended to educate the reader about particular embodiments, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

| | LIST OF REFERENCE CHARACTERS |
|---|---|
| 10 | Constellation |
| 11 | Orbit |
| 12 | Satellite |
| 14 | Radiation interface |
| 15a, 15b, 15c | Radiated energy |
| 16a, 16b, 16c | Footprint formed on Earth |
| 17a, 17b, 17c | Reception zone |
| 18 | Linear spanning cells |
| 20 | Longitudinal axis of linear spanning cell |
| 22 | Multiple linear segments |
| 24 | Corrected position of longitudinal axis |
| 30 | Satellite body |
| 32 | Solar array |
| 34 | Parabolic reflector |
| 36 | Inertia wheel |
| 38 | Antenna positioning servo |
| 39 | Radio-frequency feed to antenna |
| 40 | Altitude and latitude signal |
| 42 | Converter |
| 44 | Control signal |
| 46 | Radio receiver |
| 48 | Synchronizing pulse |
| 50 | Timers |
| 52 | Elapsed time code |
| 54 | Converter |
| 56 | Control signal |
| 58 | Attitude sensor |
| 60 | Angle of satellite longitudinal axis with Earth's axis |
| 62 | Satellite velocity vector |
| 64 | Latitude |
| 66 | Microprocessor |
| 68 | Beam offset angle |
| 72 | Star tracker |
| 74 | Equator-crossing pulse |
| 76 | Timer |
| 78 | Time since crossing |
| 80 | Function generator |
| 82 | Angle of satellite longitudinal axis with Earth's axis |
| 84 | Adder |
| 86 | Beam offset angle |
| 100 | Global Positioning Satellite receiver |
| 102 | Receiver antenna |
| 104 | Low noise amplifier |
| 106 | Mixer |
| 108 | Bandpass filter |
| 110 | Intermediate frequency amplifier |
| 112 | Active detector |
| 114 | Local oscillator |
| 116 | Doppler offset |
| 118 | Satellite selector |
| 120 | Chosen satellite number |
| 122 | Code generator |

LIST OF REFERENCE CHARACTERS

| | |
|---|---|
| 123 | Code tracking control loop |
| 124 | Local clock |
| 125 | Temperature-compensated crystal oscillator |
| 126 | Time signal |
| 127 | Code phase shift |
| 128 | Health information |
| 130 | Signal decoder |
| 132 | Almanac memory |
| 134 | Ephemeride memory |
| 136 | GPS satellite orbit calculator |
| 138 | Positions of all GPS satellites |
| 140 | Navigation microprocessor |
| 142 | Latitude |
| 144 | Altitude |
| 146 | Longitude |
| 148 | Precise time |
| 150 | Speed and course computer |
| 152 | Speed and course |
| 154 | Attitude computer |
| 156 | Antenna angle |
| 158 | Second receiver |
| 200 | Graph of correction angle versus latitude |
| 202 | Correction angle |
| 204 | Argument of perigee |
| 206 | Latitude |
| 108 | Graph of latitude of nadir versus argument of perigee |
| 210 | Latitude of Nadir |
| 212 | Argument of perigee |
| 214 | Graph of surface velocity of Earth versus North or South latitude |
| 216 | Surface velocity of the Earth |
| 218 | North or South latitude |
| E | Earth |
| F | Fixed terminal |
| G | Gateway |
| GC | Great circle |
| M | Mobile terminal |
| N | Nadir |
| NP | North Pole |
| P | Portable terminal |
| SP | South Pole |
| T | Direction of travel of satellite (space coordinates) |
| T' | Track of satellite on ground |
| φ | Compensation angle |

What is claimed is:

1. A method for controlling the transmission of a beam of radiated energy (15a, 15b, 15c) to a terminal (P, M, F, G) from a position above the Earth (E) comprising the steps of:

operating a satellite (12) in an Earth orbit (11);
said satellite (12) having a track (T') with respect to a point on the Earth's surface while flying in a direction (T) at an altitude above the Earth (E) which is not an Equatorial geosynchronous altitude;
said satellite (12) having a radiation interface (14);
said radiation interface (14) being capable of transmitting said beam of radiated energy (15a, 15b, 15c) to said terminal (P, M, F, G);

forming a footprint (16a, 16b, 16c) using said radiation interface (14) which is capable of transmitting said beam of radiated energy (15a, 15b, 15c) to said terminal (P, M, F, G );

partitioning said footprint (16a, 16b, 16c) into at least one linear spanning cell (18);
said linear spanning cell (18) extending across entire said footprint (16a, 16b, 16c);
said linear spanning cell (18) having a longitudinal axis (20);

aligning said longitudinal axis (20) of said linear spanning cell (18) continually, generally parallel to said track (T') of said satellite (12) on the Earth's surface; and directing said beam of radiated energy (15a, 15b, 15c) to said linear spanning cell (18) in said footprint (16a, 16b, 16c) by rotating the direction of said beam of radiation energy (15a, 15b, 15c) by an amount generally equal to a correction angle φ(L).

2. A method in accordance with claim 1, further comprising the step of:

dividing said linear spanning cell (18) into multiple linear segments (22); and directing said beam of radiated energy (15a, 15b, 15c) to each of said multiple linear segments (22) in said linear spanning cell (18).

3. A method in accordance with claim 1, in which the step of continually said longitudinal axis (20) of said linear spanning cell (18) includes correcting the alignment of said linear spanning cell (18) by shifting the position of said longitudinal axis (20) to a corrected position (24) by a correction angle having a value φ(L);

said value φ(L) being measured between the track (T') of said satellite (12) on the Earth's surface and a great circle (GC) on the Earth's surface;
said great circle (GC) containing a projection of the direction (T) of the satellite orbit (11) and the nadir (N) position of the satellite (12);
such that the alignment of said linear spanning cell (18) is compensated for the changing relative motion of the Earth's surface at various latitudes.

4. A method in accordance with claim 1, further comprising the step of:

configuring the position of said radiation interface (14) to be continually, generally aligned parallel to the relative motion of the Earth's surface; the track (T') of said radiation interface (14) over the Earth being generally a spiral.

5. A method for controlling the reception of radiated energy (15a, 15b, 15c) at a position above the Earth (E) comprising the steps of:

operating a satellite (12) in an Earth orbit (11);
said satellite (12) having a track (T') with respect to a point on the Earth's surface while flying in a direction (T) at an altitude above the Earth (E) which is not an Equatorial geosynchronous altitude;
said satellite (12) having a radiation interface (14);
said radiation interface (14) being capable of receiving radiated energy (15a, 15b, 15c);

mapping a reception zone (17a, 17b, 17c) on the Earth's surface using said radiation interface (14);
said reception zone (17a, 17b, 17c) containing all positions from which radiated energy (15a, 15b, 15c) may be received by said radiation interface (14) aboard said satellite (12) at a particular instant of time;

partitioning said reception zone (17a, 17b, 17c) into at least one linear spanning cell (18);
said linear spanning cell (18) having a longitudinal axis (20);

aligning said longitudinal axis (20) of said linear spanning cell (18) continually, generally parallel to said track (T') of said satellite (12) on the Earth's surface; and directing said beam of radiated energy (15a, 15b, 15c) to said linear spanning cell (18) in said reception zones (17a, 17b, 17c) by rotating the direction of said beam of radiation energy (15a, 15b, 15c) by an amount generally equal to a correction angle φ(L).

6. A method in accordance with claim 5, further comprising the step of:
   dividing said linear spanning cell (18) into multiple linear segments (22); and
   directing said beam of radiated energy (15a, 15b, 15c) to each of said multiple linear segments (22) in said linear spanning cell (18).

7. A method in accordance with claim 5, in which the step of continually aligning said longitudinal axis (20) of said linear spanning cell (18) includes
   correcting the alignment of said linear spanning cell (18) by shifting the position of said longitudinal axis (20) to a corrected position (24) by a correction angle having a value $\phi(L)$;
   said value $\phi(L)$ being measured between
      the track (T') of said satellite (12) on the Earth's surface and
      a great circle (GC) on the Earth's surface;
   said great circle (GC) containing a projection of the direction (T) of the satellite orbit (11) and the nadir (N) position of the satellite (12);
   such that the alignment of said linear spanning cell (18) is compensated for the changing relative motion of the Earth's surface at various latitudes.

8. A method in accordance with claim 5, further comprising the step of:
   configuring the position of said radiation interface (14) to be continually, generally parallel to the relative motion of the Earth's surface; the track (T') of said radiation interface (14) over the surface of the Earth (E) being generally a spiral.

* * * * *

UNITED STATES PATENT AND TRADEMARK OFFICE
CERTIFICATE OF CORRECTION

PATENT NO. : 5,621,415

DATED : April 15, 1997

INVENTOR(S) : Edward F. Tuck

It is certified that error appears in the above-identified patent and that said Letters Patent is hereby corrected as shown below:

Column 4, line 31: "Satellite" should be --Satellites--.

Column 4, line 49: after "East", insert --,a--.

Column 5, line 53: "protection" should be "projection".

Column 5, line 54: "satelite's" should be --satellite's--.

Column 6, line 17: "imprint" should be --footprint--.

Column 6, line 64: "t" should be --$\tau$--.

Column 7, line 55: "satelites" should be --satellites--.

Column 8, line 13: after "sin($L$)=sin(i)*sin($f$+$\omega$)", insert --(Equation 5)--.

Column 8, lines 23-25: Please move "Using the" to line 24 and continue with the sentence as header for the following paragraphs.

Column 9, line 39: after "vector", please insert --62--.

UNITED STATES PATENT AND TRADEMARK OFFICE
CERTIFICATE OF CORRECTION

PATENT NO. : 5,621,415

DATED : April 15, 1997

INVENTOR(S) : Edward F. Tuck

It is certified that error appears in the above-identified patent and that said Letters Patent is hereby corrected as shown below:

Column 9, line 40: "$V_n$" should be --$V_s$--.

Column 9, line 65: after "V'=V cos £", please insert --   (Equation 7)--.

Column 10, line 11: "a control" should be --control a--.

Column 10. Line 47: "another" should be --other--.

Column 11, line 22: after "can", please delete --be--.

Column 11, line 25: after "Methods" and before "Pointing", please insert --of--

Column 11, line 54: after "terminal" and before "P,", please insert --F,--.

Column 11, line 57: after "terminal" and before "P,", please insert --F,--.

Column 11, line 57: after "of a terminal" and before "P,", please insert --F,--.

Column 11, line 59: after terminal" and before P,", please insert --F,--.

Column 11, line 63: after terminal" and before P,", please insert --F,--.

UNITED STATES PATENT AND TRADEMARK OFFICE
CERTIFICATE OF CORRECTION

PATENT NO. : 5,621,415
DATED : April 15, 1997
INVENTOR(S) : Edward F. Tuck

It is certified that error appears in the above-identified patent and that said Letters Patent is hereby corrected as shown below:

Column 11, line 67: after terminal" and before P,", please insert --F,--.

Signed and Sealed this

Twenty-fifth Day of November, 1997

Attest:

BRUCE LEHMAN

Attesting Officer

Commissioner of Patents and Trademarks